(12) United States Patent
Miyahara (10) Patent No.: US 9,256,176 B2
(45) Date of Patent: Feb. 9, 2016

(54) FIXING BELT, FIXING DEVICE, AND METHOD FOR MANUFACTURING FIXING BELT

(71) Applicant: CANON KABUSHIKI KAISHA, Tokyo (JP)

(72) Inventor: Yasuhiro Miyahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/283,414

(22) Filed: May 21, 2014

(65) Prior Publication Data

US 2014/0348559 A1  Nov. 27, 2014

(30) Foreign Application Priority Data

May 23, 2013  (JP) ................. 2013-108831

(51) Int. Cl.

| | | |
|---|---|---|
| *G03G 15/20* | (2006.01) | |
| *B32B 37/14* | (2006.01) | |
| *B32B 7/00* | (2006.01) | |
| *B32B 25/00* | (2006.01) | |
| *B32B 25/08* | (2006.01) | |
| *B32B 25/20* | (2006.01) | |
| *B32B 27/06* | (2006.01) | |
| *B32B 27/08* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B32B 1/08* | (2006.01) | |

(Continued)

(52) U.S. Cl.
CPC .............. *G03G 15/2057* (2013.01); *B32B 1/08* (2013.01); *B32B 7/00* (2013.01); *B32B 25/00* (2013.01); *B32B 25/08* (2013.01); *B32B 25/20* (2013.01); *B32B 27/06* (2013.01); *B32B 27/08* (2013.01); *B32B 27/20* (2013.01); *B32B 27/28* (2013.01); *B32B 27/304* (2013.01); *B32B 27/322* (2013.01); *B32B 37/14* (2013.01); *B32B 38/16* (2013.01); *B32B 2037/243* (2013.01); *B32B 2038/0072* (2013.01); *B32B 2264/00* (2013.01); *B32B 2307/30* (2013.01); *B32B 2307/306* (2013.01); *B32B 2307/51* (2013.01); *B32B 2307/746* (2013.01); *B32B 2311/18* (2013.01); *B32B 2311/20* (2013.01); *B32B 2311/24* (2013.01); *B32B 2313/04* (2013.01); *B32B 2413/00* (2013.01); *G03G 15/2053* (2013.01); *G03G 2215/2035* (2013.01)

(58) Field of Classification Search
CPC .......... G03G 15/2053; G03G 15/2057; G03G 2215/2048; G03G 2215/2054
See application file for complete search history.

(56) References Cited

U.S. PATENT DOCUMENTS 6,395,444 B1 * 5/2002 Riehle et al. ................. 399/320
2009/0208260 A1 * 8/2009 Hasegawa ..................... 399/325

(Continued)

FOREIGN PATENT DOCUMENTS

| JP | 63-313182 A | 12/1988 |
| JP | 2-157878 A | 6/1990 |

(Continued)

*Primary Examiner* — Gregory H Curran
(74) *Attorney, Agent, or Firm* — Canon U.S.A. Inc., IP Division (57) ABSTRACT

A fixing belt includes an inner layer, serving as a sliding layer, in which filler particles having an aspect ratio of 5 or more are oriented substantially in the longitudinal direction of the fixing belt.

20 Claims, 9 Drawing Sheets

(51) Int. Cl.
  *B32B 38/16* (2006.01)
  *B32B 37/24* (2006.01)
  *B32B 38/00* (2006.01)

(56) References Cited

U.S. PATENT DOCUMENTS

| | | | |
|---|---|---|---|
| 2011/0026987 A1* | 2/2011 | Hasegawa | 399/329 |
| 2011/0318077 A1* | 12/2011 | Mukoyama et al. | 399/333 |
| 2012/0014726 A1* | 1/2012 | Sekihara et al. | 399/333 |

FOREIGN PATENT DOCUMENTS

| | | |
|---|---|---|
| JP | 4-44075 A | 2/1992 |
| JP | 2001-341143 A | 12/2001 |
| JP | 2002-258648 A | 9/2002 |
| JP | 2005-121825 A | 5/2005 |
| JP | 2005-300915 A | 10/2005 |
| JP | 2009-251253 A | 10/2009 |
| JP | 2010-134094 A | 6/2010 |
| WO | WO2005/054960 A1 | 6/2005 |

* cited by examiner

FIXING BELT, FIXING DEVICE, AND METHOD FOR MANUFACTURING FIXING BELT

BACKGROUND OF THE INVENTION

1. Field of the Invention

The present invention relates to fixing belts, fixing devices, and methods for manufacturing fixing belts.

2. Description of the Related Art

Japanese Patent Laid-Open Nos. 63-313182 and 2-157878 propose fixing devices including a fixing belt with low heat capacity that provides a short startup time.

Such fixing devices include a heating element fixed and supported inside the fixing belt. This heating element tends to degrade the inner surface of the fixing belt as the fixing belt slides over the heating element. After extended use, this may result in self-induced vibration, which is called stick-slip, and an increased torque required to rotate the fixing belt.

Accordingly, Japanese Patent Laid-Open No. 2001-341143 proposes a fixing belt including an inner layer having the surface thereof roughened to improve the sliding resistance thereof.

This technique, however, is insufficient because the roughened surface is effective only at an early stage of use; the asperities wear gradually during extended use and will eventually almost disappear.

Accordingly, Japanese Patent Laid-Open No. 2009-251253 proposes a fixing belt including an inner layer containing filler particles such as molybdenum disulfide, carbon, or diamond-like carbon to improve the sliding resistance thereof.

Although this technique provides more durable asperities on the inner layer, it is insufficient in view of the increasing process speed and durability of image-forming apparatuses in recent years.

SUMMARY OF THE INVENTION

The present invention provides an endless fixing belt including an inner layer and an outer layer disposed outside the inner layer. The inner layer contains filler particles, and 75% or more of the filler particles have an aspect ratio of 5 or more and are oriented at an angle within ±30° from a longitudinal direction of the fixing belt.

The present invention further provides a fixing device including a first rotating member, a second rotating member, and a pressing member. The first and second rotating members are configured to fix a toner image formed on a sheet in a nip therebetween. The first rotating member is an endless belt including an inner layer and an outer layer disposed outside the inner layer. The pressing member is disposed inside the belt and is configured to press the belt against the second rotating member. The inner layer contains filler particles, and 75% or more of the filler particles have an aspect ratio of 5 or more and are oriented at an angle within ±30° from a longitudinal direction of the belt.

The present invention further provides a method for manufacturing an endless fixing belt. This method includes the steps of adding filler particles having an aspect ratio of 5 or more to a resin, providing a base layer for forming the fixing belt, and applying the resin containing the filler particles inside the base layer while relatively moving the resin containing the filler particles relative to the base layer in a longitudinal direction of the base layer.

Further features of the present invention will become apparent from the following description of exemplary embodiments with reference to the attached drawings.

DESCRIPTION OF THE EMBODIMENTS

Embodiments of the present invention will now be described. The present invention, however, is not limited to these embodiments; various modifications are possible within the scope of the present invention.

First embodiment (1) Overview of Example Image-Forming Apparatus

Figure 1:
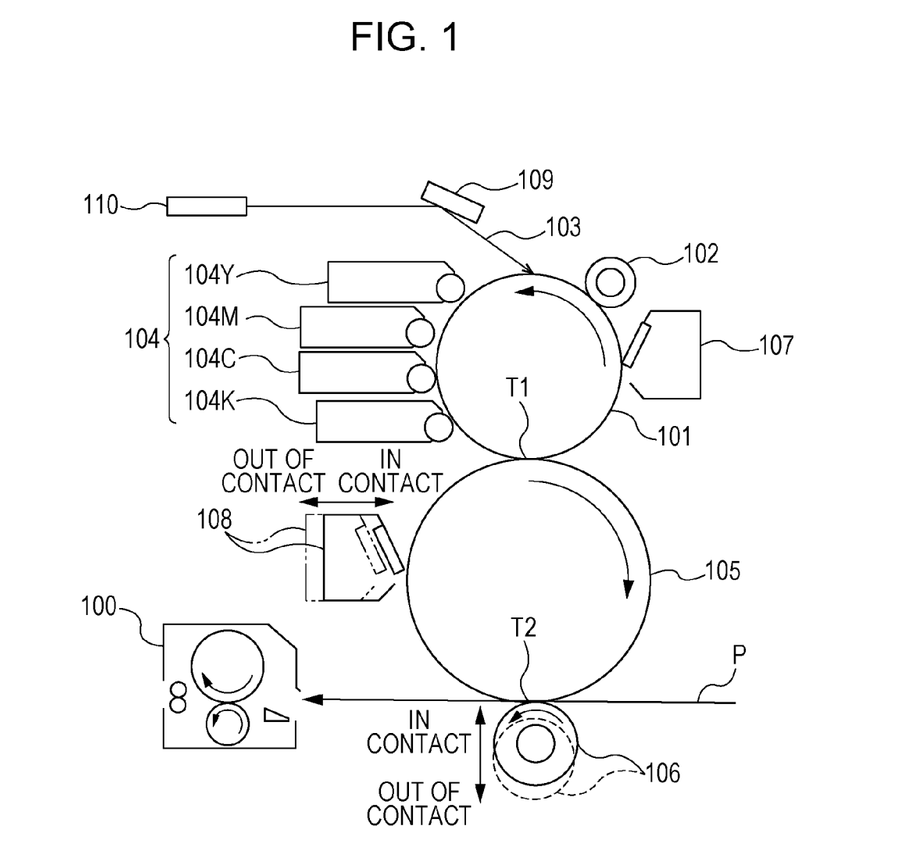
FIG. 1 is a schematic sectional view of an image-forming apparatus.

FIG. 1 is a schematic view of an image-forming apparatus according to this embodiment. This image-forming apparatus is a single-drum four-color electrophotographic apparatus. This image-forming apparatus includes a rotatable electrophotographic photoreceptor drum (hereinafter referred to as "drum") 101 serving as an image carrier. The drum 101 rotates counterclockwise, as indicated by the arrow, at a predetermined process speed (peripheral speed). During rotation, the surface of the drum 101 is uniformly charged to a predetermined polarity and potential by a charging device 102, such as a charging roller.

The charged surface is exposed to a laser beam 103 emitted from a laser optical system 110 based on input image information. The laser optical system 110 emits a laser beam 103 modulated (on/off) with time-series electrical digital image signals corresponding to color image information from an image-signal generating device (not shown) such as an image-reading device. The laser beam 103 is scanned across the surface of the drum 101 to expose the surface of the drum 101. As a result, an electrostatic latent image corresponding to the image information is formed on the surface of the drum 101. A mirror 109 directs the laser beam 103 emitted from the laser optical system 110 to the position of the drum 101 to be exposed.

The electrostatic latent image formed on the drum 101 is developed by a developing device 104 to form a toner image. In this image-forming apparatus, an electrostatic latent image corresponding to a yellow (Y) component image of a color image is first formed on the surface of the drum 101. The electrostatic latent image is developed with a Y toner by a Y developing unit 104Y to form a Y toner image. The Y toner image is transferred to the surface of an intermediate transfer drum 105 in a primary transfer area T1 where the drum 101 contacts the intermediate transfer drum 105. The toner remaining on the drum 101 after primary transfer is removed by a cleaner 107.

The above image-forming process cycle of charging, exposure, development, primary transfer, and cleaning is sequentially repeated for a magenta (M) component image, a cyan (C) component image, and a black (K) component image of the color image. Specifically, an M toner image (formed by operating an M developing unit 104M), a C toner image (formed by operating a C developing unit 104C), and a K toner image (formed by operating a K developing unit 104K) are sequentially formed on the surface of the drum 101.

In this manner, a superimposed toner image of four colors, i.e., Y, M, C, and K, is formed on the intermediate transfer drum 105. During the formation of the four-color superimposed toner image on the intermediate transfer drum 105, a secondary transfer roller 106 and a cleaner 108 for the intermediate transfer drum 105 are kept out of contact with the intermediate transfer drum 105.

The secondary transfer roller 106 is brought into contact with the intermediate transfer drum 105 to form a secondary transfer area (nip) T2 at a predetermined control timing slightly before the leading end of the toner image formed on the intermediate transfer drum 105 reaches the position opposite the secondary transfer roller 106. The cleaner 108 is also brought into contact with the intermediate transfer drum 105.

A recording medium (e.g., a sheet of paper) P fed from a recording medium feeder (not shown) is introduced into the secondary transfer area T2 at a predetermined control timing. Specifically, the recording medium P is introduced into the secondary transfer area T2 such that the leading end of the four-color superimposed toner image formed on the intermediate transfer drum 105 and the leading end of the recording medium P are brought into register in the secondary transfer area T2. Thus, the four-color superimposed toner image is continuously simultaneously transferred from the intermediate transfer drum 105 to the recording medium P in the secondary transfer area T2.

The recording medium P leaving the secondary transfer area T2 is continuously separated from the intermediate transfer drum 105 and is introduced into a fixing device 100, serving as an image-heating device, that fixes the unfixed toner image carried on the recording medium P. Specifically, the fixing device 100 heats the toner image on the recording medium P to fix the toner image. After fixing, the recording medium P is discharged outside as an imaged product. After the recording medium P is separated from the intermediate transfer drum 105, the surface of the intermediate transfer drum 105 is cleaned by a toner cleaner 108 to remove the toner remaining after secondary transfer.

(2) Overview of Fixing Device 100

Figure 2:
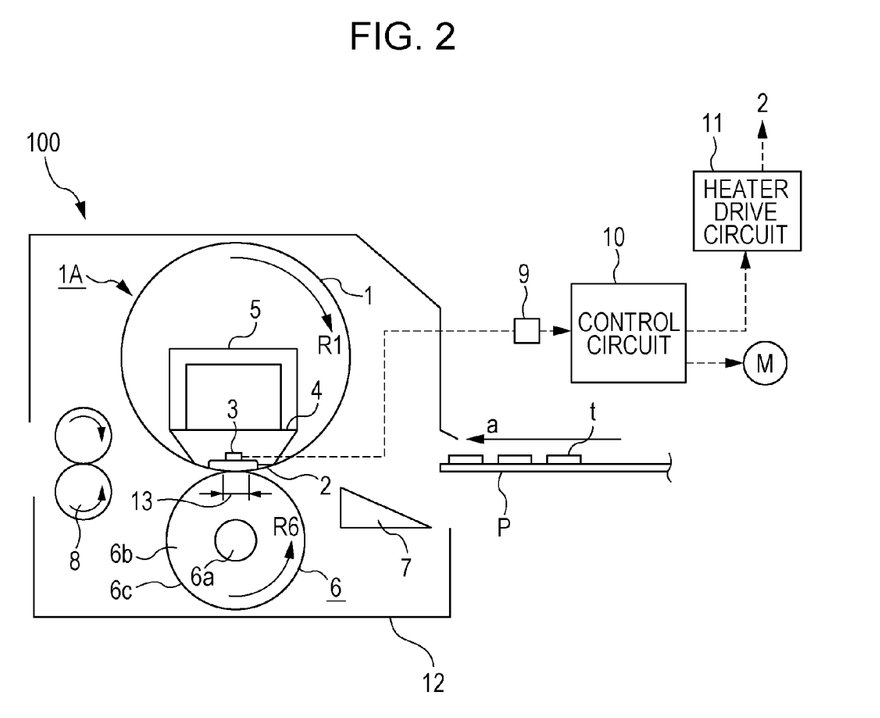
FIG. 2 is a schematic sectional view of a fixing device.

FIG. 2 is a schematic view of the fixing device 100 according to this embodiment. The fixing device 100 is a belt-heating (film-heating) on-demand image-heating device that drives a pressure member and that includes a thin flat heater as a fixing heater (heating element or heat source). This type of image-heating device is disclosed, for example, in Japanese Patent Laid-Open No. 4-44075.

The fixing device 100 is an elongated device extending parallel to the direction perpendicular to the transport direction a of the recording medium P in the plane of the path through which the recording medium P is transported (i.e., extending in the direction perpendicular to the figure). The fixing device 100 mainly includes a fixing unit (heating unit) 1A, a pressure roller 6 serving as a pressure member (rotating member), and a device frame (fixing device housing) 12 containing the fixing unit 1A and the pressure roller 6.

The fixing unit 1A is an assembly including a belt guide/heater holder (pressing member) 4, a fixing heater 2 serving as a heating element, a fixing belt stay 5, and a flexible cylindrical fixing belt (endless belt) 1 serving as a fixing member (rotating member) and including an elastic layer.

The holder 4 is an elongated member made of a heat-resistant liquid crystal polymer resin and functions to hold the heater 2 and to shape the belt 1 so that the recording medium P is separable therefrom.

The heater 2 used in this embodiment is an elongated thin flat ceramic heater fitted and held in a groove extending along the length of the holder 4 substantially in the center of the bottom surface of the holder 4. The heater 2 is a resistor having the property of rapidly heating up when supplied with current. More specifically, the heater 2 includes an alumina substrate, a resistor formed thereon by applying a conductive paste containing a silver-palladium alloy by screen printing to form a uniform film having a thickness of about 10 μm, and a reinforced glass coating formed thereon. The glass coating forms the front surface (heating surface) of the heater 2. The heater 2 is held by the holder 4, with the glass coating facing outward.

The stay 5 is an elongated rigid member having an inverted U-shape in transverse cross section and made of a metal such as iron. The stay 5 is disposed on the top surface of the holder 4 parallel to the holder 4. The layer structure of the belt 1 will be described in detail in Item (3). The belt 1 is loosely fitted around the assembly of the holder 4, the heater 2, and the stay 5.

Although not shown, flanges are attached to both ends of the stay 5 in the longitudinal direction. These flanges function to regulate the positions of the ends of the belt 1 and to retain the shape thereof.

The pressure roller 6 includes a stainless steel core 6a on which a silicone rubber layer 6b having a thickness of about 3 mm and a tetrafluoroethylene-perfluoro(alkyl vinyl ether) copolymer (PFA) resin tube 6c having a thickness of about 40 μm are stacked in the above order to form a multilayer structure. The core 6a of the pressure roller 6 is rotatably supported at both ends thereof by side plates (not shown) at both ends of the device frame 12 in the longitudinal direction.

The fixing unit 1A is disposed above and parallel to the pressure roller 6 between the side plates at both ends of the device frame 12 in the longitudinal direction, with the heater 2 facing the pressure roller 6. The flanges at both ends are pressed toward the pressure roller with a predetermined pressing force by pressure mechanisms (not shown).

The above pressing force moves all of the flanges at both ends, the stay 5, and the holder 4 toward the pressure roller 6. Thus, the heater 2 presses the pressure roller 6, with the fixing belt 1 therebetween, with a predetermined pressing force against the elasticity of the elastic layer 6b to form a fixing nip 13 having a predetermined width between the belt 1 and the pressure roller 6 in the transport direction a of the recording medium P.

In this embodiment, the heater 2 is urged against the pressure roller 6 by a force of 156.8 N (16 kgf) on each of the flanges at both ends, i.e., a total force of 313.6 N (32 kgf). As a result, the front surface (bottom surface) of the heater 2, serving as a heating surface, is pressed against the pressure roller 6, with the fixing belt 1 therebetween, with a predetermined pressing force against the elasticity of the elastic layer 6b to form the fixing nip 13 having the predetermined width required for fixing.

The fixing operation of the fixing device 100 is as follows. A control circuit (CPU) 10 serving as a control unit starts a fixing motor M at a predetermined control timing to rotate the pressure roller 6 counterclockwise, as indicated by arrow R6, at a predetermined speed.

As the pressure roller 6 rotates, the frictional force between the belt 1 and the pressure roller 6 in the fixing nip 13 produces a torque on the belt 1. This causes the belt 1 to rotate clockwise, as indicated by arrow R1, around the holder 4 and the stay 5 at the speed substantially corresponding to the speed of the pressure roller 6 while the inner surface thereof slides in close contact with the surface of the heater 2. The inner surface of the belt 1 is coated with a semisolid lubricant to ensure sufficient slidability between the heater 2 and holder 4 and the inner surface of the belt 1.

The control circuit 10 also starts supplying current from a heater drive circuit 11, serving as a power supply unit, to the heater 2. This causes the heater 2 to heat up rapidly throughout the effective region along the length thereof. The increased temperature is detected by a thermistor 3, serving as a temperature-detecting unit, disposed in contact with the back surface (top surface) of the heater 2. The thermistor 3 is connected to the control circuit 10 via an A/D converter 9.

The control circuit 10 samples the output of the thermistor 3 at a predetermined period to perform temperature control based on the thus-acquired temperature information. That is, the control circuit 10 functions to determine the details of the temperature control of the heater 2 based on the output of the thermistor 3 and to control the current supply to the heater 2 through the heater drive circuit 11 to adjust the temperature of the heater 2 to the target temperature (set temperature).

While the fixing device 100 is in the above state, a recording medium P carrying an unfixed toner image t is transported from the secondary transfer area T2 of the image-forming section to the fixing device 100. The recording medium P is guided into the fixing nip 13 by a guide member 7 and is nipped and transported through the fixing nip 13. During the transportation of the recording medium P through the fixing nip 13, heat is transferred from the heater 2 through the belt 1 to the recording medium P. The unfixed toner image t is melted by the heat from the heater 2 and is fixed to the surface of the recording medium P by the pressure applied in the fixing nip 13. The recording medium P leaving the fixing nip 13 is separated from the belt 1 by the curvature thereof and is transported outside the fixing device 100 by a pair of fixing paper output rollers 8.

In the above fixing device 100, the heater 2 and the holder 4 holding the heater 2 constitute a backup member inside the fixing belt 1. While the fixing belt 1 rotates and fixes the toner image on the recording medium P by heating, the inner surface of the fixing belt 1 slides over the surface of the heater 2 and the holder 4 opposite the fixing belt 1 in the fixing nip 13.

(3) Overview of Fixing Belt 1

FIGS. 3A to 4B are schematic views of the layer structure of the fixing belt 1 according to this embodiment. The fixing belt 1 includes a cylindrical substrate (base layer) 1c and a sliding layer (inner layer (innermost layer)) 1b formed inside the cylindrical substrate 1c. The sliding layer 1b slides over the heater 2 and the holder 4, serving as a backup member (pressing member), and is disposed inside the cylindrical substrate 1c. The sliding layer 1b contains needle-shaped shape-anisotropic filler particles 1a oriented substantially parallel to the longitudinal direction (width direction) of the fixing belt 1.

Figure 3A:
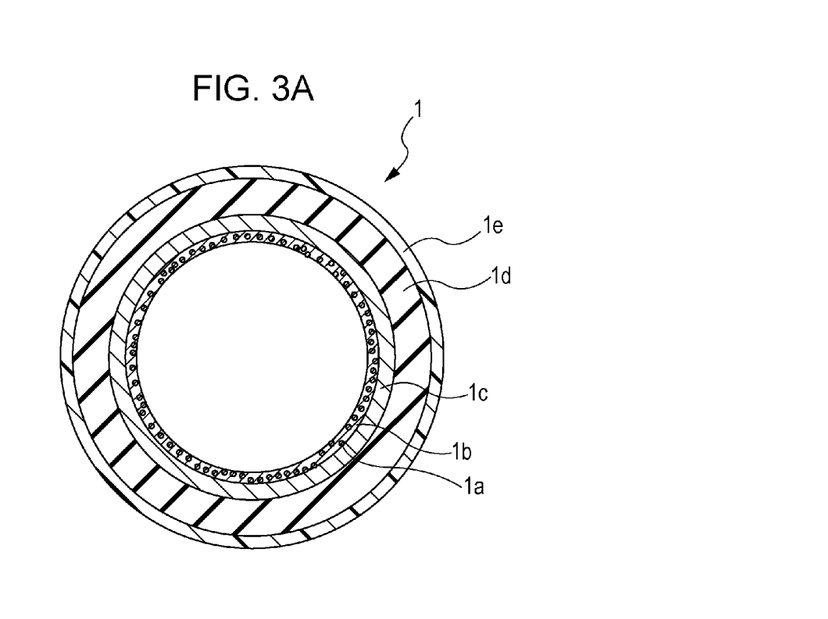
FIGS. 3A and 3B are schematic views of a fixing belt (including a cylindrical substrate made of a metal).
Figure 3B:
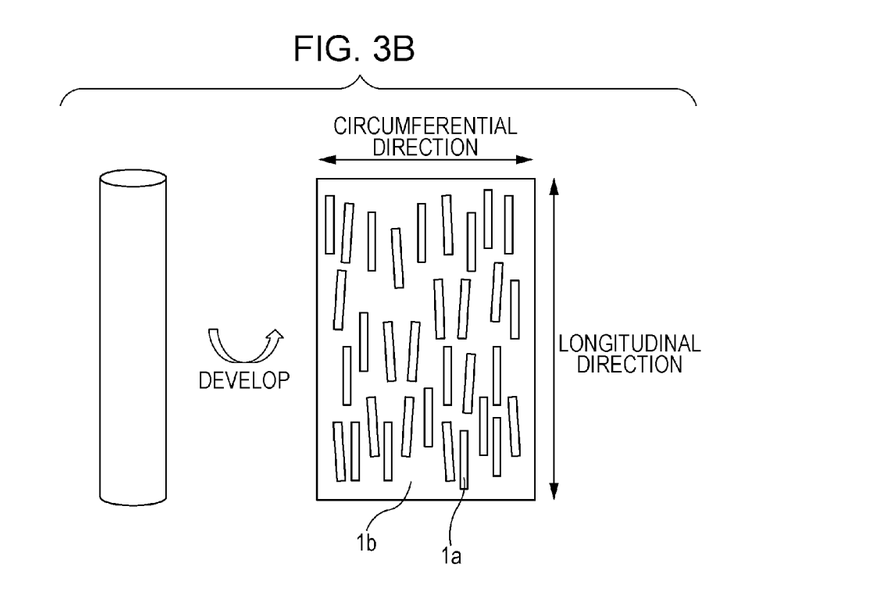

Although this embodiment illustrates an example in which the cylindrical substrate 1c is made of a metal, it can be made of other materials.

For example, the cylindrical substrate 1c can be made of a heat-resistant resin. In this case, the sliding layer 1b is omitted, and the cylindrical substrate 1c itself contains the shape-anisotropic filler particles 1a (see FIGS. 4A and 4B). That is, the cylindrical substrate 1c itself functions as a sliding layer that contains the shape-anisotropic filler particles 1a.

The fixing belt 1 further includes a silicone rubber elastic layer 1d covering the outer surface of the cylindrical substrate 1c, with a primer layer therebetween. The fixing belt 1 further includes a fluorine resin layer as a toner release layer (outer layer (outermost layer)) 1e covering the silicone rubber elastic layer 1d, with a silicone rubber adhesive layer therebetween. The individual layers will now be specifically described.

(3-1) Cylindrical Substrate 1c

The cylindrical substrate 1c can be made of a material with high heat and bending resistance because the fixing belt 1 requires heat resistance. Examples of metal substrates include electroformed nickel substrates such as those disclosed in Japanese Patent Laid-Open No. 2002-258648, International Publication No. WO2005/054960, and Japanese Patent Laid-Open No. 2005-121825. Examples of heat-resistant resin substrates include polyimide, polyamideimide, and polyetheretherketone resin substrates such as those disclosed in Japanese Patent Laid-Open Nos. 2005-300915 and 2010-134094.

In this embodiment, the cylindrical substrate 1c is an endless cylindrical substrate made of a nickel-iron alloy and having an inner diameter of 30 mm, a thickness of 40 µm, and a length of 400 mm.

(3-2) Sliding Layer 1b

Examples of resins used for the sliding layer 1b include resins with high durability and heat resistance, such as polyimide resins, polyamideimide resins, and polyetheretherketone resins. In particular, the sliding layer 1b can be made of a polyimide resin for reasons of, for example, ease of manufacturing, heat resistance, elastic modulus, and strength. In this embodiment, the sliding layer 1b is made of a polyimide resin.

(3-2-1) Polyimide Precursor Solution

The polyimide resin sliding layer 1b is formed on the inner surface of the cylindrical substrate 1c as follows. Specifically, the polyimide resin sliding layer 1b is formed by applying, drying, and heating a polyimide precursor solution on the inner surface of the cylindrical substrate 1c to cause a dehydration ring-closure reaction. The polyimide precursor solution is prepared by reacting substantially equimolar amounts of an aromatic tetracarboxylic dianhydride or a derivative thereof and an aromatic diamine in an organic polar solvent.

Typical examples of aromatic tetracarboxylic dianhydrides include pyromellitic dianhydride, 3,3',4,4'-biphenyltetracarboxylic dianhydride, 3,3',4,4'-benzophenonetetracarboxylic dianhydride, and 2,3,6,7-naphthalenetetracarboxylic dianhydride. These aromatic tetracarboxylic dianhydrides can be used alone or in combination.

Typical examples of aromatic diamines include 4,4'-diaminodiphenyl ether, p-phenylenediamine, and benzidine. These aromatic diamines can be used alone or in combination.

Examples of organic polar solvents include dimethylacetoamide, dimethylformamide, N-methyl-2-pyrrolidone, phenol, and o-, m-, and p-cresols.

(3-2-2) Addition of Shape-Anisotropic Filler Particles 1a

The shape-anisotropic filler particles 1a can be needle-shaped filler particles. Examples of such filler particles include carbon fibers, carbon nanotubes, aluminum borate ($xAl_2O_3 \cdot yB_2O_3$), zinc oxide (ZnO), titanium oxide ($TiO_2$), silicon nitride ($Si_3N_4$), silicon carbide (SiC), and potassium titanate ($K_2Ti_6O_{13}$).

As used herein, the term "needle-shaped filler" refers to whisker fillers and fibrous fillers. The filler 1a is added to the polyimide precursor solution, and it is pre-stirred with a stirrer and is then vacuum-degassed to prepare a coating solution.

Although the optimum content of the shape-anisotropic filler 1a varies depending on the type of polyimide precursor solution, which is used as the base, and the type of shape-anisotropic filler 1a, the content of the filler 1a can be adjusted so as to satisfy 2 μm≤Rz≤6 μm, where Rz is the surface roughness (ten-point average roughness) of the sliding layer 1b. An Rz of more than 6 μm is undesirable because the filler 1a might damage the heating element 2, serving as a pressing member, and might also damage the core used in forming. An Rz of less than 2 μm is undesirable because the filler 1a would not effectively improve the slidability.

The aspect ratio of the shape-anisotropic filler 1a (the ratio of the long side to the short side thereof) can be about 5 to 40. In particular, a filler 1a having an aspect ratio of about 10 to 25 can be easily oriented in the direction in which the polyimide precursor solution flows during application, i.e., in the longitudinal direction of the fixing belt 1, to achieve a higher orientation ratio. A higher orientation ratio in the longitudinal direction results in a higher slidability, wear resistance, and lubricant retention and thus results in a longer life of the fixing belt 1.

This is probably because the lubricant remains on the asperities of the sliding layer 1b formed by the filler 1a orientated in the longitudinal direction and thus has a predetermined thickness or more between the sliding layer 1b and the heating element 2 fixed and supported inside the fixing belt 1 over the length of the fixing belt 1.

In the related art, the sliding layer of a fixing belt might wear on one side thereof due to uneven heat distribution in the longitudinal direction. In this embodiment, the shape-anisotropic filler 1a oriented in the longitudinal direction is also effective in providing uniform heat distribution in the longitudinal direction. This reduces uneven wear and thus results in a longer life.

The orientation ratio of the shape-anisotropic filler 1a (filler orientation ratio) for each aspect ratio is the ratio of the number N' of filler particles 1a oriented in the longitudinal direction to the total number N of filler particles 1a (the total number of filler particles 1a contained in the sliding layer 1b). In this embodiment, the orientation ratio is determined by light microscopy. The orientation ratio is calculated by the following equation:

$$A=(N'/N)\times 100(\%)$$

where A is the filler orientation ratio, N is the number of filler particles 1a examined under a light microscope, and N' is the number of filler particles 1a inclined at an angle θ of −30°≤θ≤30° from the axis of rotation of the fixing belt 1 (from the longitudinal direction of the fixing belt 1). About 50 particles are sufficient as the number N of filler particles 1a examined under a light microscope.

The filler orientation ratio A can be 75% or more for reasons of slidability, wear resistance, and lubricant retention. A filler orientation ratio A of 75% or more can be achieved by applying the polyimide precursor solution while allowing it to flow in the longitudinal direction, as in ring coating, described later. This allows the shape-anisotropic filler particles 1a to be oriented in the longitudinal direction. The polyimide precursor solution can be applied by any process by which a layer can be formed while allowing the polyimide precursor solution to flow in the longitudinal direction.

(3-2-3) Formation of Polyimide Resin Sliding Layer 1b

Figure 5A:
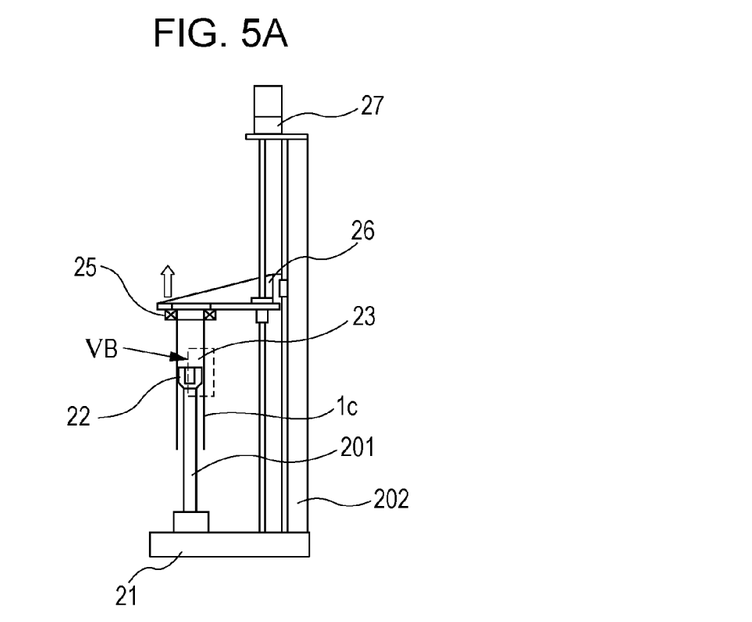
FIGS. 5A and 5B are schematic views of a coating apparatus used to form a sliding layer.
Figure 5B:
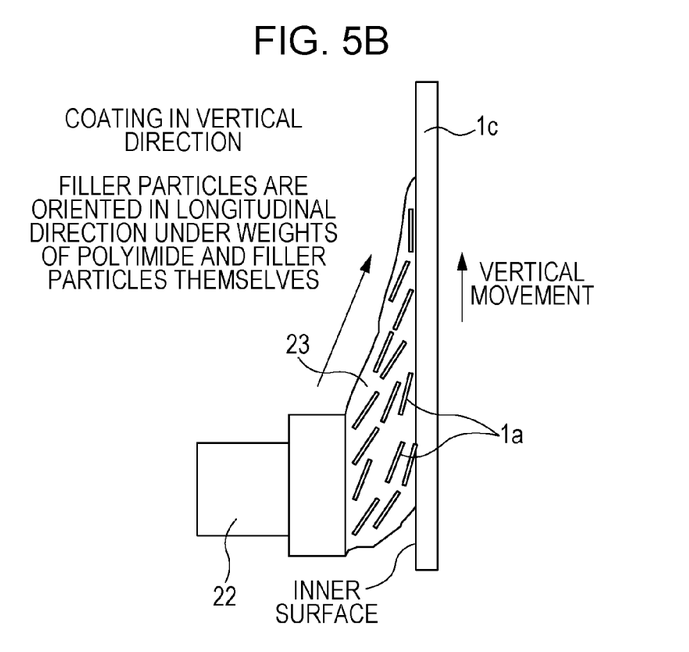

The polyimide precursor solution can be applied, for example, by ring coating. FIGS. 5A and 5B are schematic views of a ring coating apparatus. The ring coating apparatus includes a base 21 on which columns 201 and 202 are disposed. A coating head 22 is attached to the column 201, and a coating-solution supplying unit (coating mechanism) (not shown) is connected thereto.

A work hand (holding mechanism) 25 for holding the cylindrical substrate 1c on which the sliding layer 1b is to be formed inside is attached to the column 202, with a work-moving unit 26 therebetween. The work-moving unit 26 can be moved vertically by a motor 27 disposed on the column 202, and as the work-moving unit 26 is moved, the work hand 25 disposed thereon can be moved vertically.

The coating head 22 has a slit (not shown) extending perpendicular to the axis of the column 201 in the outer surface thereof. A polyimide precursor solution 23 containing the shape-anisotropic filler 1a is uniformly supplied from the slit. The cylindrical substrate 1c is fitted around the coating head 22 and is moved relative to the coating head 22 vertically along the outer surface of the coating head 22 to apply the polyimide precursor solution 23 to the inner surface of the cylindrical substrate 1c. In this apparatus, the thickness of the sliding layer 1b is determined by the amount of polyimide precursor solution 23 applied. Any amount of polyimide precursor solution applied can be achieved by changing the clearance, the supply rate of the polyimide precursor solution 23, and the moving speed of the work-moving unit 26.

As described above, the polyimide precursor solution 23, containing the shape-anisotropic filler 1a, used to form the sliding layer 1b on the inner surface of the cylindrical substrate 1c is applied vertically (in the longitudinal direction of the fixing belt 1). This coating process allows the filler particles 1a to flow in the longitudinal direction and thereby allows the filler particles 1a to be oriented in the longitudinal direction of the cylindrical substrate 1c (fixing belt 1) as they flow under the weights of the polyimide and the filler particles 1a themselves.

After coating, the cylindrical substrate 1c having the inner surface thereof coated is dried, for example, in a hot-air circulating furnace at 60° C. for 30 minutes and is then fired in the hot-air circulating furnace within the temperature range in which the fatigue strength of the cylindrical substrate 1c does not decrease, i.e., 200° C. to 240° C., for 10 to 60 minutes. This causes a dehydration ring-closure reaction to form the polyimide inner sliding layer 1b.

Figure 4A:
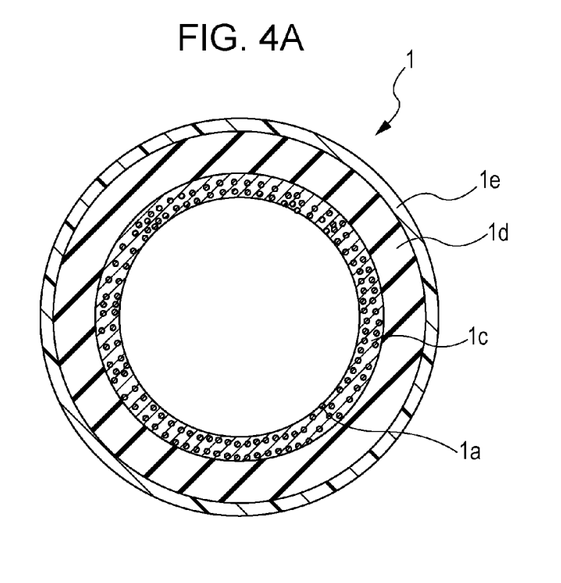
FIGS. 4A and 4B are schematic views of a fixing belt (including a cylindrical substrate made of a heat-resistant resin).
Figure 4B:
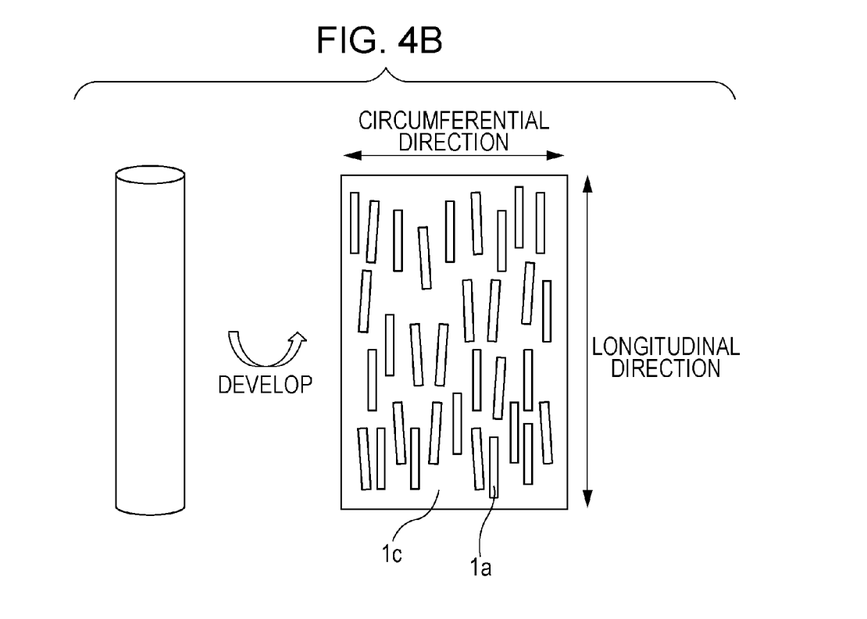

A cylindrical substrate 1c made of a polyimide resin can be manufactured basically in the same manner. Specifically, a known method can be used in which a polyimide precursor solution is applied to the outer or inner surface of a cylindrical core, and the coating of the polyimide precursor solution on the core is dried and cured (imidized) by heating. Alternatively, the coating can be removed from the surface of the core when it cures to a sufficient strength to retain the shape of a tube and can then be cured by heating in the next step.

(4) Elastic Layer 1d

In this embodiment, the elastic layer 1d is made of a silicone rubber layer (hereinafter referred to as "silicone rubber elastic layer"). The silicone rubber elastic layer 1d functions as an elastic layer supported by the fixing belt 1 to apply a uniform pressure to the asperities on a toner image and a sheet of paper during fixing. To achieve this function, the silicone rubber elastic layer 1d can be, but not limited to, a cured layer of an addition-curable silicone rubber for reasons of workability. The elasticity of the silicone rubber can be adjusted by adjusting the degree of crosslinking depending on the type and amount of filler, described later.

(4-1) Addition-Curable Silicone Rubber

A typical addition-curable silicone rubber contains an organopolysiloxane having an unsaturated aliphatic group, an organopolysiloxane having an active hydrogen atom attached to a silicon atom, and a platinum compound serving as a crosslinking catalyst. The organopolysiloxane having an active hydrogen atom attached to a silicon atom reacts with the alkenyl group of the organopolysiloxane having an unsaturated aliphatic group under the catalytic action of the platinum compound to form a crosslinked network.

The silicone rubber elastic layer 1d can contain a filler, for example, to improve the thermal conductivity, strength, and heat resistance of the fixing belt 1. In particular, the silicone rubber elastic layer 1d can contain a high-thermal-conductivity filler to improve the thermal conductivity. For example, the high-thermal-conductivity filler can be an inorganic material, particularly a metal or metal compound.

Examples of high-thermal-conductivity fillers include silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni).

These can be used alone or in combination. The high-thermal-conductivity filler can have an average particle size of 1 to 50 μm for reasons of ease of handling and dispersibility. The filler can be, for example, spherical, pulverized, plate-shaped, or whisker-shaped. In particular, the filler can be spherical for reasons of dispersibility.

The silicone rubber elastic layer 1d preferably has a thickness of 100 to 500 μm, more preferably 200 to 400 μm, in terms of the contribution to the surface hardness of the fixing belt 1 and the efficiency of heat conduction to unfixed toner during fixing.

(4-2) Formation of Silicone Rubber Elastic Layer 1d

Figure 6:
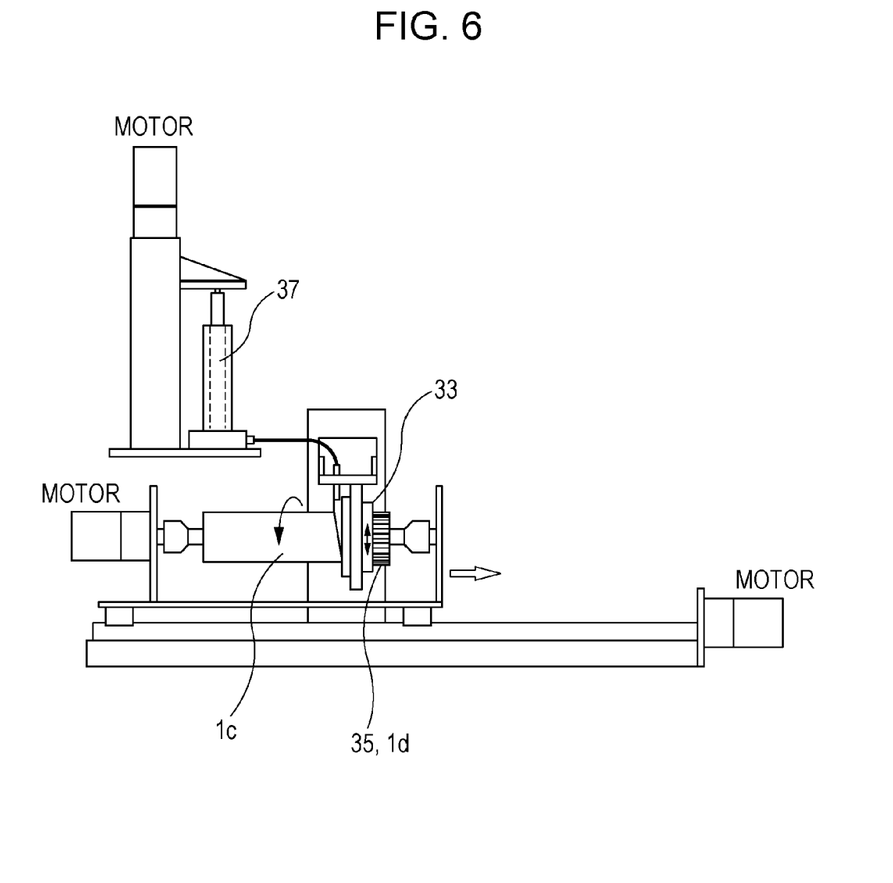
FIG. 6 is a schematic view of a coating apparatus used to form a silicone rubber elastic layer.

FIG. 6 is a schematic view illustrating an example of a process of forming the silicone rubber elastic layer 1d on the cylindrical substrate 1c, i.e., ring coating. An addition-curable silicone rubber composition 35 containing an addition-curable silicone rubber and a filler is charged into a cylinder pump 37 and is pumped to apply the addition-curable silicone rubber composition 35 from a coating solution supply nozzle (not shown) disposed in a coating head 33 to the outer surface of the cylindrical substrate 1c.

The outer surface of the cylindrical substrate 1c needs to be primed in advance. The primer used is required to have a higher wettability on the cylindrical substrate 1c than the silicone rubber elastic layer 1d. Examples of such primers include hydrosilyl (SiH) silicone primers, vinyl silicone primers, and alkoxy silicone primers. The primer layer can have a sufficient thickness to be uniform and to deliver its adhesion performance, for example, about 1 to 3 μm.

The cylindrical substrate 1c is integrated with a cylindrical core inserted therein. The cylindrical substrate 1c can be moved at constant speed to the right in the figure during application to form a coating of the addition-curable silicone rubber composition 35 on the outer surface of the cylindrical substrate 1c. The thickness of the coating can be controlled, for example, depending on the clearance between the coating solution supply nozzle and the cylindrical substrate 1c, the supply rate of the silicone rubber composition 35, and the moving speed of the cylindrical substrate 1c.

In this embodiment, for example, a silicone rubber composition layer having a thickness of 300 μm is formed by setting the clearance between the coating solution supply nozzle and the cylindrical substrate 1c to 0.8 mm, the supply rate of the silicone rubber composition 35 to 2.9 mm/s, and the moving speed of the cylindrical substrate 1c to 40 mm/s. The layer of the addition-curable silicone rubber composition 35 formed on the cylindrical substrate 1c can be heated using a heater such as an electric furnace for a predetermined period of time to promote a crosslinking reaction, thus forming the silicone rubber elastic layer 1d.

(5) Toner Release Layer 1e

The toner release layer 1e is made of a fluorine resin and is formed in a tube shape. Examples of fluorine resins include tetrafluoroethylene-perfluoro(alkyl vinyl ether) copolymer (PFA), polytetrafluoroethylene (PTFE), and tetrafluoroethylene-hexafluoropropylene copolymer (FEP). Among the materials illustrated above, the toner release layer 1e can be made of PFA for reasons of formability and toner releasability. In this embodiment, the toner release layer 1e is made of tube-shaped PFA (hereinafter referred to as "PFA tube").

The toner release layer 1e can have a thickness of 50 μm or less. Such a toner release layer 1e maintains the elasticity of the underlying silicone rubber elastic layer 1d when stacked thereon and therefore does not excessively increase the surface hardness of the fixing belt 1. The inner surface of the PFA tube can be subjected to, for example, sodium treatment, excimer laser treatment, or ammonia treatment in advance to achieve improved adhesion.

The silicone rubber adhesive layer used to bond the PFA tube 1e, serving as a fluorine resin layer, to the silicone rubber elastic layer 1d is a cured layer of an addition-curable silicone rubber adhesive applied to the surface of the silicone rubber elastic layer 1d. The addition-curable silicone rubber adhesive contains an addition-curable silicone rubber containing a self-adhesive component such as a silane having a functional group such as acryloxy, hydrosilyl (SiH), epoxy, or alkoxysilyl.

The addition-curable silicone rubber adhesive is cured by heating using a heater such as an electric furnace for a predetermined period of time to bond the PFA tube 1e. The PFA tube 1e is then cut at both ends to the desired length to obtain the fixing belt 1 as a fixing member according to this embodiment.

EXAMPLE 1

A polyimide precursor solution containing p-phenylenediamine as an aromatic diamine (U-Varnish S from Ube Industries, Ltd.) was obtained. To the solution, aluminum borate having an aspect ratio of 10 (with a diameter of 1 μm and a length of 10 μm) was added as the shape-anisotropic filler 1a in an amount of 5% by weight based on the total solid content by weight (based on 100% by weight of solids in the varnish). The solution was pre-stirred with a stirrer and was vacuum-degassed to prepare a polyimide precursor solution.

The precursor solution was applied to a thickness of 15 μm on the inner surface of a nickel-iron alloy cylindrical substrate 1c having an inner diameter of 30 mm, a thickness of 40 μm, and a length of 343 mm and was fired at 200° C. for 20 minutes to cause imidization, thus forming the inner sliding layer 1b. The precursor solution was applied by ring coating, described above, with the cylindrical substrate 1c supported vertically. The clearance was 25 mm, and the coating speed was 15 mm/s.

A hydrosilyl silicone primer (DY39-051 A/B from Shin-Etsu Chemical Co., Ltd.) was applied to the outer surface of the cylindrical substrate 1c and was fired at 200° C. for 5 minutes. An addition-curable silicone rubber was then applied to a thickness of 300 μm on the surface of the primer layer and was fired at 200° C. for 20 minutes to form the silicone rubber elastic layer 1d.

The addition-curable silicone rubber stock solution was prepared by mixing materials (a) and (b) below such that the ratio (H/Vi) of the number of Si—H groups to the number of vinyl groups was 0.45 and then adding a catalytic amount of a platinum compound.

(a) A vinylated polydimethylsiloxane having at least two vinyl groups per molecule (weight average molecular weight: 100,000 (on a polystyrene basis))

(b) A hydrogen organopolysiloxane having at least two Si—H groups per molecule (weight average molecular weight: 1,500 (on a polystyrene basis))

A PFA tube having a thickness of 40 μm (from Gunze Limited) was fitted as the toner release layer 1e to the surface of the silicone rubber elastic layer 1d, with a silicone adhesive (SE1819 CV A/B from Dow Corning Toray Co., Ltd.) therebetween, and was fired at 200° C. for 2 minutes.

The properties of the polyimide sliding layer 1b of the fixing belt 1 thus fabricated are shown in Table 1.

EXAMPLE 2

A fixing belt was fabricated as in Example 1 except that aluminum borate having an aspect ratio of 20 (with a diameter of 1 μm and a length of 20 μm) was used as the shape-anisotropic filler 1a. The properties of the polyimide sliding layer 1b of the fixing belt thus fabricated are shown in Table 1.

EXAMPLE 3

A fixing belt was fabricated as in Example 1 except that aluminum borate having an aspect ratio of 5 (with a diameter of 1 μm and a length of 5 μm) was used as the shape-anisotropic filler 1a. The properties of the polyimide sliding layer 1b of the fixing belt thus fabricated are shown in Table 1.

EXAMPLE 4

A fixing belt was fabricated as in Example 1 except that the aluminum borate used as the shape-anisotropic filler 1a was added in an amount of 1% by weight based on the total solid content by weight (based on 100% by weight of solids in the varnish). The properties of the polyimide sliding layer 1b of the fixing belt thus fabricated are shown in Table 1.

EXAMPLE 5

A fixing belt was fabricated as in Example 1 except that the aluminum borate used as the shape-anisotropic filler 1a was added in an amount of 3% by weight based on the total solid content by weight (based on 100% by weight of solids in the varnish). The properties of the polyimide sliding layer 1b of the fixing belt thus fabricated are shown in Table 1.

EXAMPLE 6

A fixing belt was fabricated as in Example 1 except that the aluminum borate used as the shape-anisotropic filler 1a was added in an amount of 8% by weight based on the total solid content by weight (based on 100% by weight of solids in the varnish). The properties of the polyimide sliding layer 1b of the fixing belt thus fabricated are shown in Table 1.

EXAMPLE 7

A fixing belt was fabricated as in Example 1 except that the aluminum borate used as the shape-anisotropic filler 1a was added in an amount of 10% by weight based on the total solid content by weight (based on 100% by weight of solids in the varnish). The properties of the polyimide sliding layer 1b of the fixing belt thus fabricated are shown in Table 1.

COMPARATIVE EXAMPLES

For comparison with Examples 1 to 7, fixing belts having the same layer structure except for the inner sliding layer 1b and including the inner sliding layers 1b shown in Table 1 were fabricated as Comparative Examples 1 to 5.

Specifically, Comparative Example 1 is a fixing belt including a polyimide inner sliding layer containing no filler. Comparative Example 2 is a fixing belt including a polyimide inner sliding layer containing no filler and having a roughened surface. Comparative Example 3 is a fixing belt including an inner sliding layer containing spherical silica as a filler. Comparative Example 4 is a fixing belt including an inner sliding layer containing flaky mica as a filler. Comparative Example 5 is a fixing belt including an inner sliding layer containing aluminum borate having an aspect ratio of 3 (with a diameter of 1 μm and a length of 3 μm) as a filler.

Wear Resistance Test

The wear resistance of the inner sliding layer 1b in an actual system is related to the scratch resistance thereof. An inner sliding layer 1b having a lower scratch resistance wears at a higher speed, and therefore, wear debris generated therefrom in an actual system increases the load torque at a higher speed. This causes problems with paper transportation earlier.

The inner sliding layer of each of the examples and the comparative examples was evaluated for scratch resistance using a linear reciprocating sliding tester (Friction Player FRP-2100 from Rhesca Co., Ltd.). An alumina ball having 3/16 inches was pressed against the surface of the inner sliding layer and was reciprocated 300 times at a speed of 200 mm/sec over a width of 30 mm in the circumferential direction of the fixing belt in an environment at 200° C. to examine the wear condition of the surface. The load was increased in increments of 50 g. The load at which wear reached the substrate was determined as the scratch resistance of the inner sliding layer. The results are shown in Table 1.

The fixing belts of Comparative Examples 1 and 2, which included a polyimide inner sliding layer containing no filler, had low scratch resistances, i.e., about 1,300 to 1,400 gf. The fixing belts of Examples 1 to 7 and Comparative Examples 3 to 5, which included an inner sliding layer containing a filler, had higher wear resistances than those including an inner sliding layer containing no filler, i.e., scratch resistances of about 2,300 to 2,600 gf.

Paper Feed Durability Test Using Actual System

Each of fixing devices including the fixing belts of the examples and the comparative examples was mounted in an iR ADVANCE C5051 full-color copier (from CANON KABUSHIKI KAISHA). A paper feed durability test was performed by feeding 400 k (400,000) sheets of paper at a pressing force of 313.6 N (32 kgf), a fixing nip size of 8 mm×230 mm, a fixing temperature of 200° C., and a process speed of 246 mm/sec. The inner surface of the fixing belt was coated with 1.2 g of a grease (HP300 from Dow Corning Asia) as a lubricant. The results are shown in Table 1.

The fixing belts of Comparative Examples 1 to 4, which included an inner sliding layer containing no shape-anisotropic filler, caused abnormal sound (noise) due to stick-slip, and the durability test was interrupted. This result is probably related to the scratch resistance and lubricant retention of the inner sliding layer.

The fixing belts of Comparative Examples 1 and 2, which included an inner sliding layer containing no filler, caused stick-slip early, i.e., after 70 to 110 k sheets of paper were fed.

This is probably because a large amount of wear debris was generated from the inner sliding layer, which exhibited low scratch resistance in the wear resistance test, and the resulting wear debris decreased the slidability of the lubricant-coated inner surface of the fixing belt.

The fixing belts of Comparative Examples 3 and 4, which included an inner sliding layer containing a spherical or flaky filler, did not exhibit particularly low scratch resistances in the wear resistance test; however, stick-slip occurred after 130 to 170 k sheets of paper were fed, indicating that they had shorter lives than those including an inner sliding layer containing a shape-anisotropic filler, described later. This is probably related to, for example, the difference in lubricant retention due to the profile of the inner sliding layer formed by the filler contained therein and uneven wear due to uneven heat distribution in the longitudinal direction.

The fixing belts of Examples 1 to 7 and Comparative Example 5, which included an inner sliding layer containing a shape-anisotropic filler, did not cause stick-slip or caused stick-slip after a larger number of sheets of paper were fed than those including an inner sliding layer containing no shape-anisotropic filler, indicating that they had longer lives.

Examples 1 to 3 and Comparative Example 5 show the test results obtained with varying aspect ratios of the shape-anisotropic filler, i.e., 3 (Comparative Example 5), 5 (Example 3), 10 (Example 1), and 20 (Example 2).

Whereas Comparative Example 5, which had an aspect ratio of 3, caused stick-slip after 280 k sheets of paper were fed, Examples 1 to 3, which had aspect ratios of 5, 10, and 20, respectively, successfully completed the durability test in which 400 k sheets of paper were fed. These results demonstrate that the shape-anisotropic filler used in the inner sliding layer can have an aspect ratio of 5 or more.

There is basically a correlation between the aspect ratio of the shape-anisotropic filler and the filler orientation ratio if the polyimide precursor solution flows in the longitudinal direction during application, as in ring coating. Thus, the filler orientation ratios of the above examples were, in increasing order of aspect ratio, 58% (Comparative Example 5), 75% (Example 3), 84% (Example 1), and 86% (Example 2). Examples 1 to 3, which had filler orientation ratios of 75%, 84%, and 86%, respectively, successfully completed the durability test in which 400 k sheets of paper were fed, which demonstrates that the filler orientation ratio can be 75% or more.

Examples 1 and 4 to 7 show the test results obtained with varying surface roughnesses Rz (ten-point average roughnesses) of the sliding layer $1b$, i.e., 1 μm (Example 4), 2 μm (Example 5), 3 μm (Example 1), 6 μm (Example 6), and 7 μm (Example 7), by varying the content of the shape-anisotropic filler $1a$.

These examples did not cause stick-slip or caused stick-slip after 350 k or more sheets of paper were fed, indicating that they had longer lives. In particular, Examples 1, 5, and 6, which had surface roughnesses Rz of 2 to 6 μm, successfully completed the durability test in which 400 k sheets of paper were fed, indicating that they had even longer lives. This demonstrates that the sliding layer can have a surface roughness Rz of 2 to 6 μm.

TABLE 1

| Sample | Fixing belt | | | | | | | Wear resistance Scratch resistance | Paper feed durability in actual system Number of sheets of paper fed at which stick-slip occurred |
|---|---|---|---|---|---|---|---|---|---|
| | Inner sliding layer | Filler | Content | Particle size | Aspect ratio | Orientation ratio | Rz | | |
| Example 1 | Aluminum borate added | Whisker | 5 wt % | Φ 1 μm | 10 | 84% | 3 μm | 2400 gf | Not occurred |
| Example 2 | Aluminum borate added | Whisker | 5 wt % | Φ 1 μm | 20 | 86% | 3 μm | 2400 gf | Not occurred |
| Example 3 | Aluminum borate added | Whisker | 5 wt % | Φ 1 μm | 5 | 75% | 3 μm | 2400 gf | Not occurred |
| Example 4 | Aluminum borate added | Whisker | 1 wt % | Φ 1 μm | 10 | 83% | 1 μm | 2100 gf | 350 k sheets |
| Example 5 | Aluminum borate added | Whisker | 3 wt % | Φ 1 μm | 10 | 85% | 2 μm | 2200 gf | Not occurred |
| Example 6 | Aluminum borate added | Whisker | 8 wt % | Φ 1 μm | 10 | 83% | 6 μm | 2200 gf | Not occurred |
| Example 7 | Aluminum borate added | Whisker | 10 wt % | Φ 1 μm | 10 | 81% | 7 μm | 2100 gf | 380 k sheets |
| Comparative Example 1 | Polyimide alone | None | — | — | — | — | 0.5 μm | 1300 gf | 70 k sheets |
| Comparative Example 2 | Surface-roughened | None | — | — | — | — | 3 | 1400 gf | 110 k sheets |
| Comparative Example 3 | Silica added | Spherical | 5 wt % | Φ 2-8 μm | — | — | 5 μm | 2400 gf | 130 k sheets |
| Comparative Example 4 | Mica added | Flaky | 5 wt % | Φ 2-5 μm | — | — | 4 μm | 2400 gf | 170 k sheets |

TABLE 1-continued

| Sample | Fixing belt | | | | | | | Wear resistance Scratch resistance | Paper feed durability in actual system Number of sheets of paper fed at which stick-slip occurred |
| --- | --- | --- | --- | --- | --- | --- | --- | --- | --- |
| | Inner sliding layer | Filler | Content | Particle size | Aspect ratio | Orientation ratio | Rz | | |
| Comparative Example 5 | Aluminum borate added | Whisker | 5 wt % | Φ 1 μm | 3 | 58% | 3 μm | 2300 gf | 280 k sheets |

Second embodiment

Figure 7:
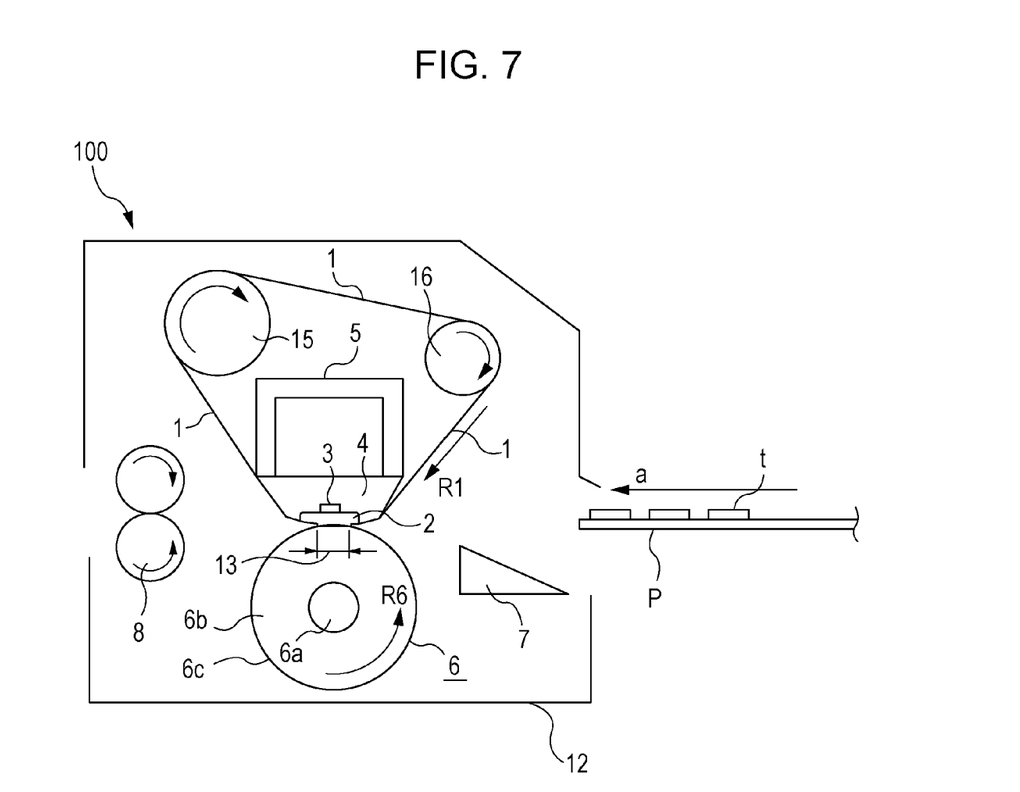
FIG. 7 is a schematic sectional view of a fixing device.

A fixing device 100 shown in FIG. 7 includes a fixing belt 1 entrained about a drive roller 15, a driven roller 16, and a holder 4, serving as a backup member, that supports a heater 2. An elastic pressure roller 6 is in contact with the heater 2 with the fixing belt 1 therebetween to form a fixing nip 13. The same components and portions as those of the fixing device 100 shown in FIG. 2 are indicated by the same reference numerals and are not described again.

As the drive roller 15 of the fixing device 100 is driven, the fixing belt 1 rotates, with the inner surface thereof sliding over the heater 2. The pressure roller 6 is rotated as the fixing belt 1 rotates.

Figure 8:
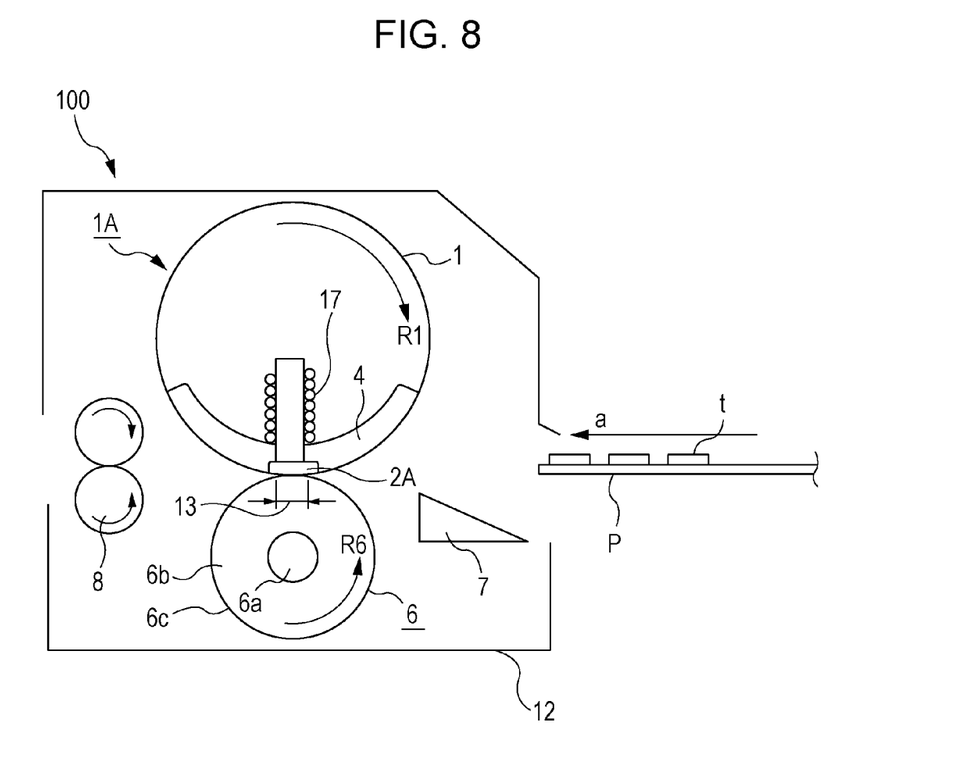
FIG. 8 is a schematic sectional view of a fixing device.

A fixing device 100 shown in FIG. 8 includes an electromagnetic induction heating plate 2A in place of the heater 2 used in the fixing device 100 shown in FIG. 2. The electromagnetic induction heating plate 2A is configured to generate heat by electromagnetic induction in an alternating magnetic field generated by an induction coil 17. The same components and portions as those of the fixing device 100 shown in FIG. 2 are indicated by the same reference numerals and are not described again.

The temperature of the electromagnetic induction heating plate 2A is detected by a thermistor (not shown). A control circuit (not shown) controls the power supplied from a power supply (not shown) to the induction coil 17 so as to maintain the temperature detected by the thermistor at a predetermined fixing temperature.

Figure 9:
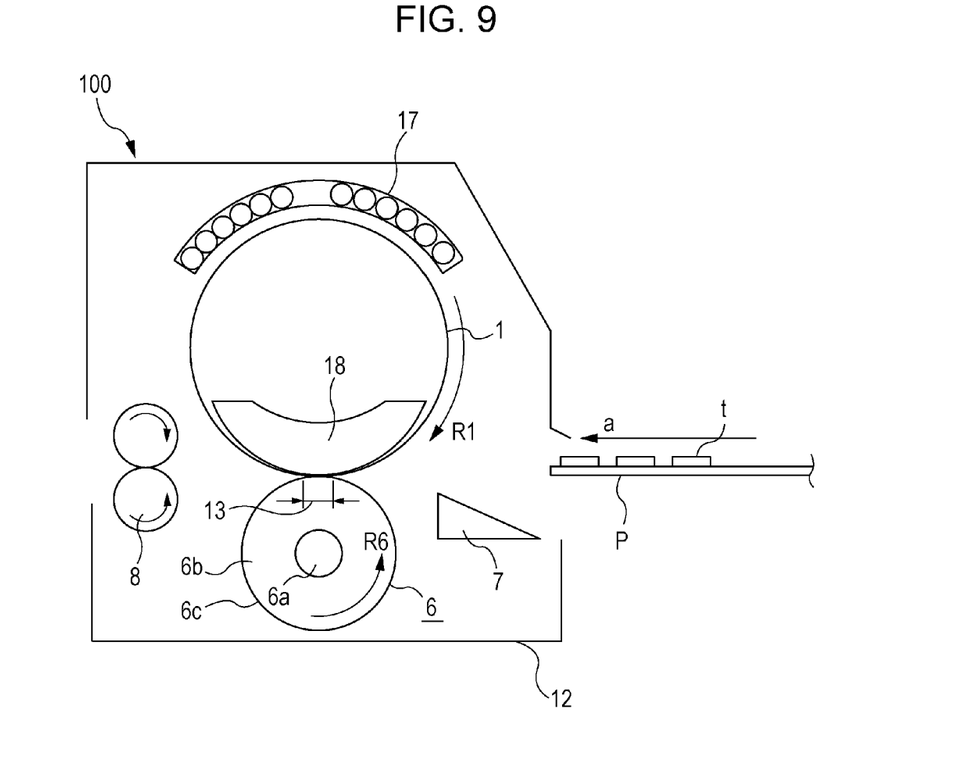
FIG. 9 is a schematic sectional view of a fixing device.

A fixing device 100 shown in FIG. 9 uses the metal substrate 1c of the fixing belt 1 used in the fixing device 100 in FIG. 2 to generate heat by electromagnetic induction in an alternating magnetic field generated by an induction coil 17 disposed outside the fixing belt 1. As the pressure roller 6 rotates, the fixing belt 1 rotates, with the inner surface thereof sliding over a backup member 18. Alternatively, the induction coil 17 can be disposed inside the fixing belt 1.

The temperature of the fixing belt 1 is detected by a thermistor (not shown). A control circuit (not shown) controls the power supplied from a power supply (not shown) to the induction coil 17 so as to maintain the temperature detected by the thermistor at a predetermined fixing temperature.

As in the fixing devices 100 shown in FIGS. 8 and 9, the fixing device 100 shown in FIG. 7 can include an induction coil 17 disposed outside or inside the fixing belt 1 to generate heat by electromagnetic induction.

The pressure member 6 that forms the fixing nip 13 with the fixing belt 1 is not necessarily a roller, but can be a rotating endless belt. Alternatively, the pressure member 6 can be a non-rotating member. Specifically, if the fixing belt 1 is rotated by a drive member, the pressure member 6 can be a non-rotating member, such as a pad or a plate-shaped member, having a surface with a low frictional coefficient in contact with the fixing belt 1 and the recording medium P.

The fixing devices according to the present invention are not necessarily used as a fixing device that heats and presses the unfixed toner t carried by the recording medium P to form a fixed image, as in the above embodiments. The present invention can also be applied to heating devices for adjusting the surface properties of images, such as those for heating and pressing an image fixed or semi-fixed to the recording medium P (fixed image or semi-fixed image) to improve the gloss thereof (they are also referred to as "fixing device").

The image-forming section of the image-forming apparatus is not necessarily an electrophotographic image-forming section, but can be an electrostatic recording or magnetic recording image-forming section. In addition, the image-forming section is not necessarily a transfer image-forming section, but can be an image-forming section that directly forms a toner image on a recording medium.

The fixing devices 100 according to the above embodiments can be used with image-forming apparatuses other than color electrophotographic printers as described in the above embodiments, including monochrome copiers, facsimiles, monochrome printers, and multifunction apparatuses. That is, the fixing devices and color electrophotographic printers according to the above embodiments do not necessarily include the above combinations of components; some or all of them can be replaced with alternative components in other embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-108831 filed May 23, 2013, which is hereby incorporated by reference herein in its entirety.

What is claimed is:

1. An endless fixing belt comprising:
    a most inner layer; and
    an outer layer disposed outside the most inner layer,
    wherein the most inner layer contains filler particles, 75% or more of the filler particles having an aspect ratio of 5 or more and being oriented at an angle within ±30° from a longitudinal direction of the fixing belt.

2. The fixing belt according to claim 1, wherein the most inner layer satisfies 2 μm≤Rz≤6 μm, where Rz is the surface roughness of the most inner layer.

3. The fixing belt according to claim 1, wherein the filler particles contained in the most inner layer are at least one of carbon fibers, carbon nanotubes, aluminum borate, zinc oxide, titanium oxide, silicon nitride, silicon carbide, and potassium titanate.

4. The fixing belt according to claim 3, wherein the most inner layer comprises a polyimide resin.

5. The fixing belt according to claim 1, wherein the outer layer comprises a fluorine resin.

6. The fixing belt according to claim 5, further comprising an elastic layer between the most inner layer and the outer layer.

7. A fixing device comprising:
a first rotating member and a second rotating member configured to fix a toner image formed on a sheet in a nip therebetween, the first rotating member being an endless belt including a most inner layer and an outer layer disposed outside the most inner layer; and
a pressing member disposed inside the belt and configured to press the belt against the second rotating member,
wherein the most inner layer contains filler particles, 75% or more of the filler particles having an aspect ratio of 5 or more and being oriented at an angle within ±30° from a longitudinal direction of the belt.

8. The fixing device according to claim 7, wherein the most inner layer satisfies 2 µm≤Rz≤6 µm, where Rz is the surface roughness of the inner layer.

9. The fixing device according to claim 7, wherein the filler particles contained in the most inner layer are at least one of carbon fibers, carbon nanotubes, aluminum borate, zinc oxide, titanium oxide, silicon nitride, silicon carbide, and potassium titanate.

10. The fixing device according to claim 9, wherein the most inner layer comprises a polyimide resin.

11. The fixing device according to claim 7, wherein the most inner layer is coated with a lubricant.

12. The fixing device according to claim 7, wherein the outer layer comprises a fluorine resin.

13. The fixing device according to claim 12, wherein the belt further includes an elastic layer between the most inner layer and the outer layer.

14. The fixing device according to claim 7, wherein
the belt further includes a base layer, and
the fixing device further comprises a coil configured to cause the base layer to generate heat by electromagnetic induction.

15. The fixing device according to claim 7, further comprising a resistor disposed on the pressing member and configured to generate heat when supplied with current.

16. A method for manufacturing an endless fixing belt, comprising the steps of:
adding filler particles having an aspect ratio of 5 or more to a resin;
providing a base layer for forming the fixing belt; and
applying the resin containing the filler particles inside the base layer while relatively moving the resin containing the filler particles relative to the base layer in a longitudinal direction of the base layer.

17. The method for manufacturing an endless fixing belt according to claim 16, wherein a holding mechanism that holds the base layer is moved relative to a coating mechanism that applies the resin containing the filler particles in the applying step.

18. The method for manufacturing an endless fixing belt according to claim 16, further comprising the steps of:
forming an elastic layer outside the base layer; and
forming a toner release layer outside the elastic layer.

19. The method for manufacturing an endless fixing belt according to claim 16, wherein the filler particles added in the adding step are at least one of carbon fibers, carbon nanotubes, aluminum borate, zinc oxide, titanium oxide, silicon nitride, silicon carbide, and potassium titanate.

20. The method for manufacturing an endless fixing belt according to claim 16, wherein
the resin is a polyimide resin, and
the filler particles added to the resin in the adding step are at least one of carbon fibers, carbon nanotubes, aluminum borate, zinc oxide, titanium oxide, silicon nitride, silicon carbide, and potassium titanate.

* * * * *